United States Patent
Kingsbury

(10) Patent No.: US 9,354,417 B2
(45) Date of Patent: May 31, 2016

(54) MULTI-PORT OPTICAL CONNECTION TERMINAL ASSEMBLIES SUPPORTING OPTICAL SIGNAL SPLITTING, AND RELATED TERMINALS AND METHODS

(75) Inventor: Brian Duane Kingsbury, Watauga, TX (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 865 days.

(21) Appl. No.: 13/535,763

(22) Filed: Jun. 28, 2012

(65) Prior Publication Data

US 2013/0004122 A1    Jan. 3, 2013

Related U.S. Application Data

(60) Provisional application No. 61/503,173, filed on Jun. 30, 2011.

(51) Int. Cl.
| | |
|---|---|
| *G02B 6/44* | (2006.01) |
| *G02B 6/26* | (2006.01) |
| *B60L 1/02* | (2006.01) |
| *H01R 43/20* | (2006.01) |

(52) U.S. Cl.
CPC ............ *G02B 6/4471* (2013.01); *G02B 6/4441* (2013.01); *Y10T 29/4921* (2015.01); *Y10T 29/49194* (2015.01); *Y10T 29/49208* (2015.01)

(58) Field of Classification Search
CPC ................. Y10T 29/49208; Y10T 29/4921; Y10T 29/49194; G02B 6/4441; G02B 6/4471
USPC ................ 385/31–34; 29/876, 868, 877
See application file for complete search history.

(56) References Cited

U.S. PATENT DOCUMENTS

| | | | |
|---|---|---|---|
| 2005/0163448 A1 | 7/2005 | Blackwell, Jr. et al. ...... 385/135 |
| 2005/0281526 A1* | 12/2005 | Vongseng ............. G02B 6/445 |
| | | | 385/135 |
| 2006/0269208 A1 | 11/2006 | Allen et al. .................... 385/135 |
| 2007/0071392 A1* | 3/2007 | Baucom ............... G02B 6/4475 |
| | | | 385/100 |
| 2008/0152292 A1* | 6/2008 | Wilken ............... G02B 6/4452 |
| | | | 385/135 |
| 2010/0086260 A1* | 4/2010 | Parikh ................ G02B 6/4444 |
| | | | 385/76 |
| 2010/0092129 A1 | 4/2010 | Conner .......................... 385/17 |
| 2010/0092171 A1* | 4/2010 | Conner ............... G02B 6/4453 |
| | | | 398/49 |
| 2011/0097050 A1 | 4/2011 | Blackwell, Jr. et al. ...... 385/135 |
| 2013/0022328 A1* | 1/2013 | Gronvall ............. G02B 6/3897 |
| | | | 385/137 |

OTHER PUBLICATIONS

Patent Cooperation Treaty Form ISA/210, Aug. 28, 2012, pp. 1-2.

* cited by examiner

*Primary Examiner* — Akm Enayet Ullah

(57) ABSTRACT

Multi-port optical connection terminal assemblies, related terminals and methods are disclosed herein. In one embodiment, a multi-port optical connection terminal assembly may include an enclosure including an internal cavity, an input orifice, and optical connection nodes. The multi-port optical connection terminal assembly may also include an optical splitter comprising a body, an input optical fiber, and output optical fibers. At least a portion of the body of the optical splitter may be disposed outside the internal cavity of the enclosure. The input optical fiber of the optical splitter may be disposed outside the internal cavity of the enclosure, and the plurality of the output optical fibers of the optical splitter may be disposed inside the internal cavity. In this manner, the enclosure of the multi-port optical connection terminal assembly is not required to be sized to completely contain the optical splitter.

34 Claims, 15 Drawing Sheets

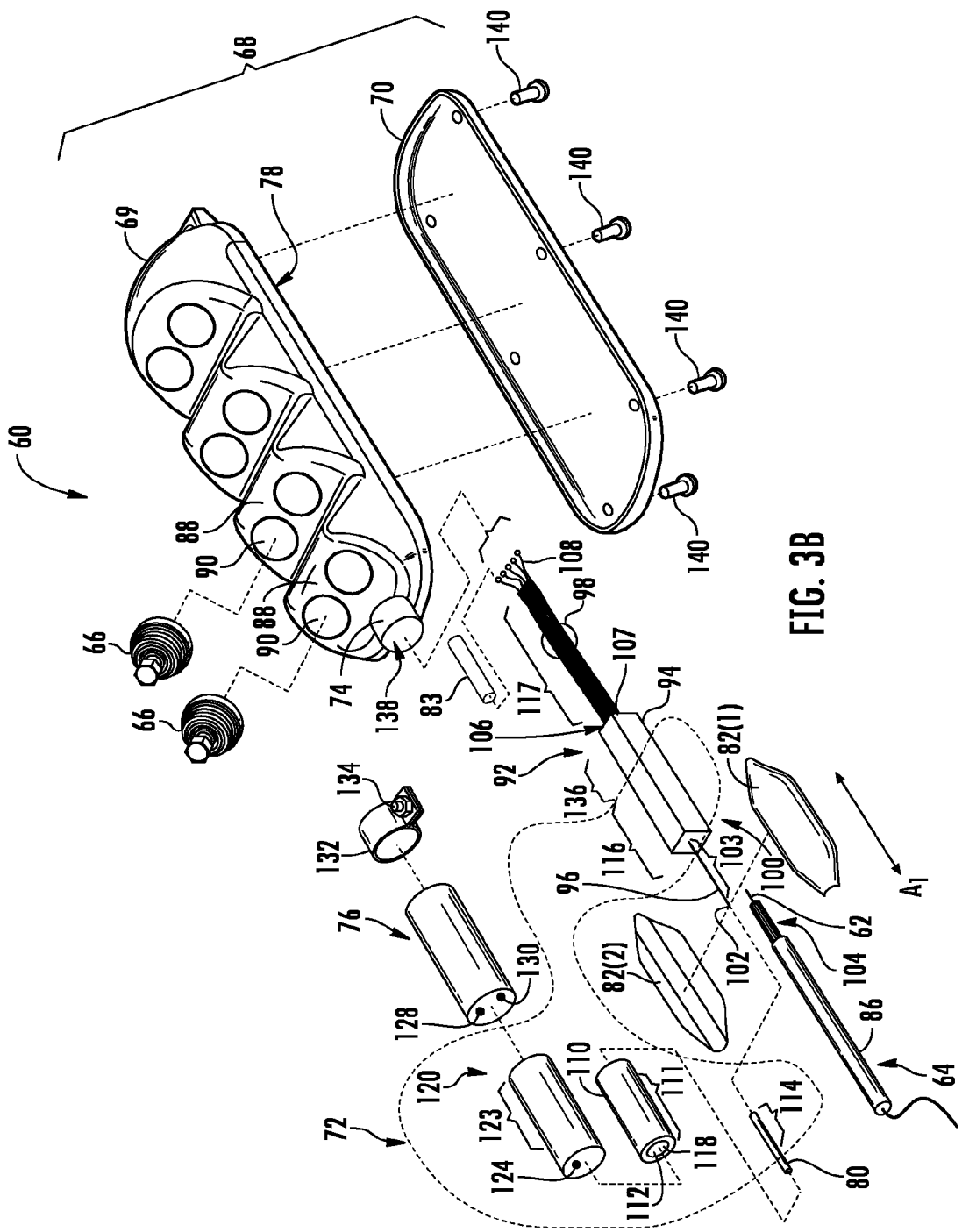

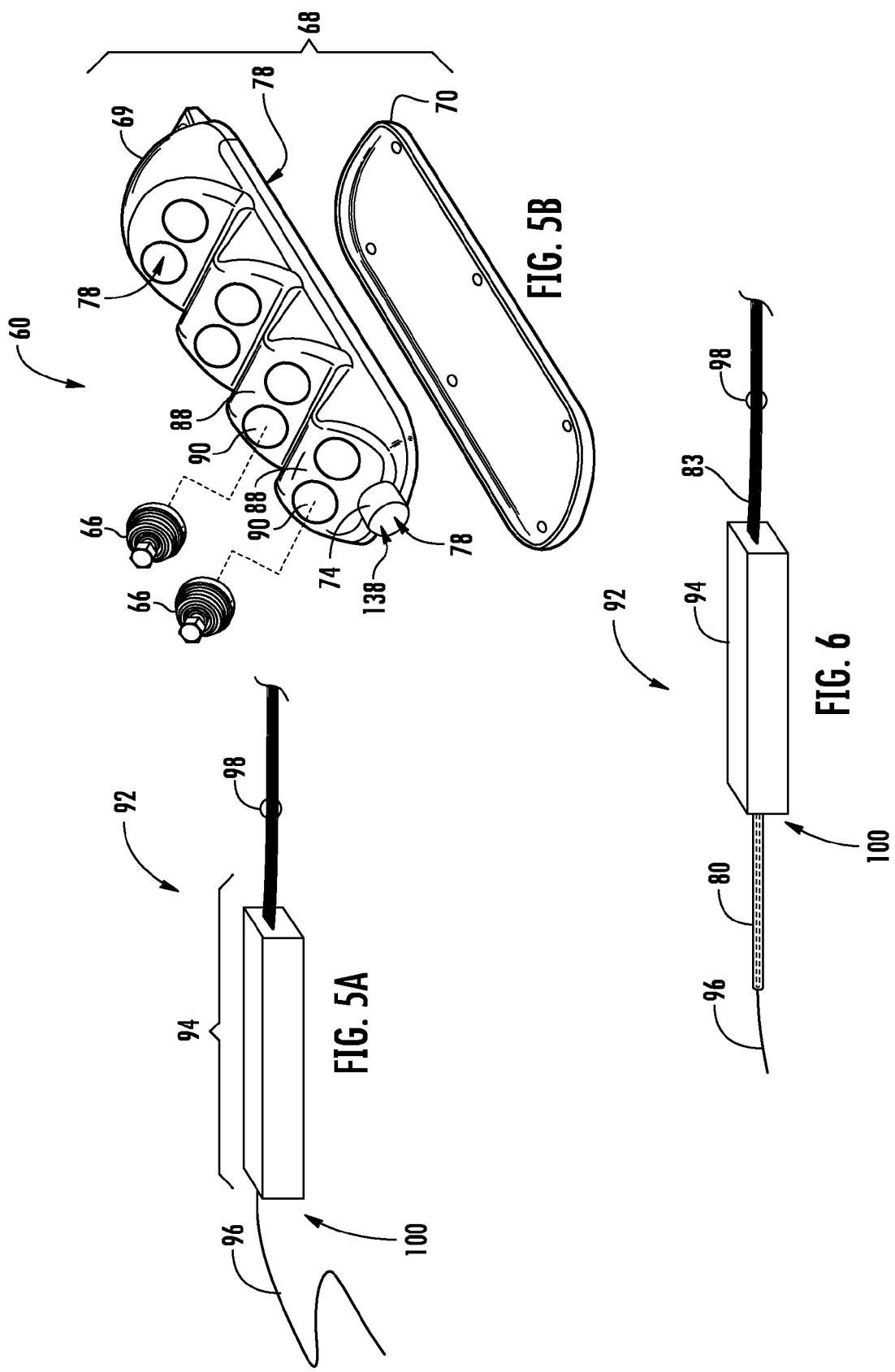

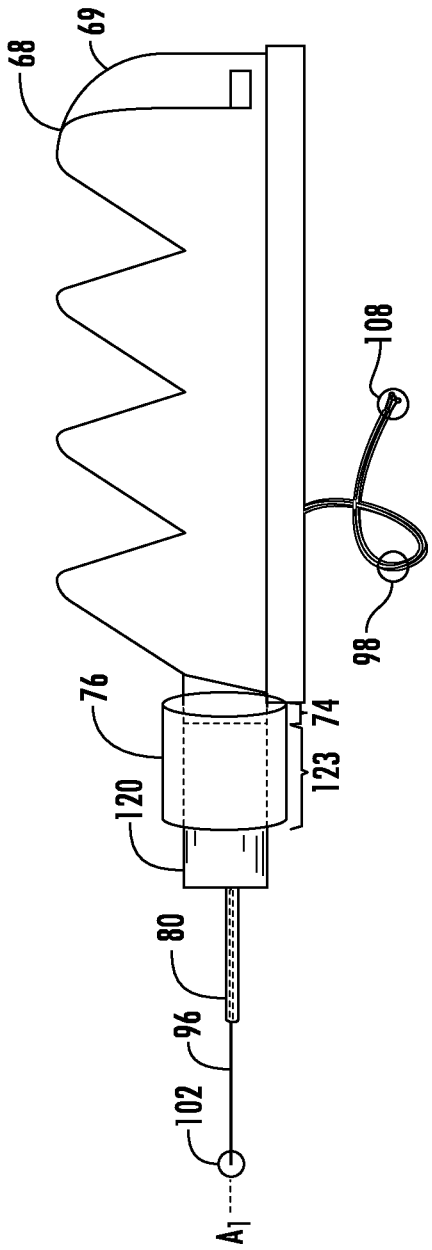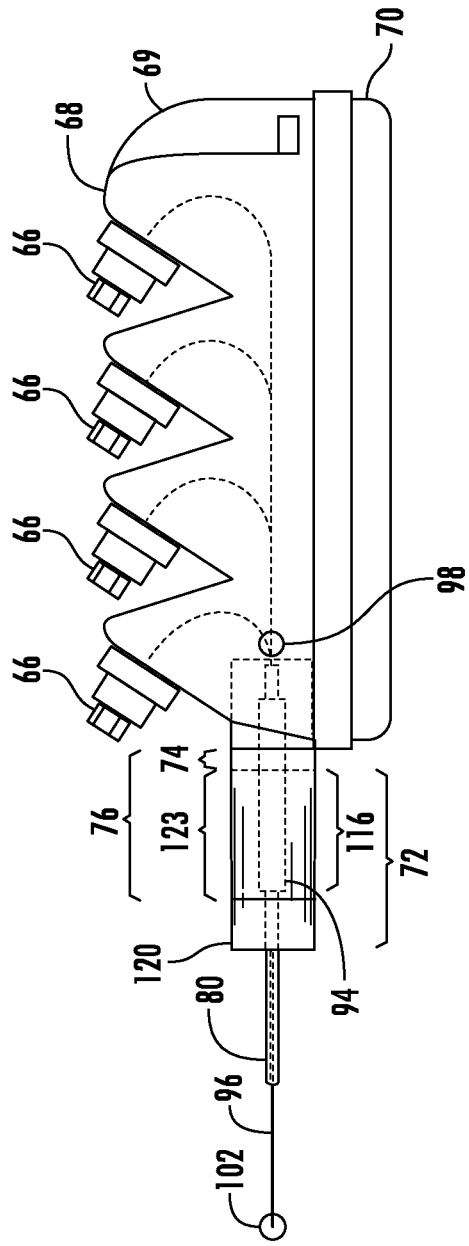
FIG. 11
FIG. 12

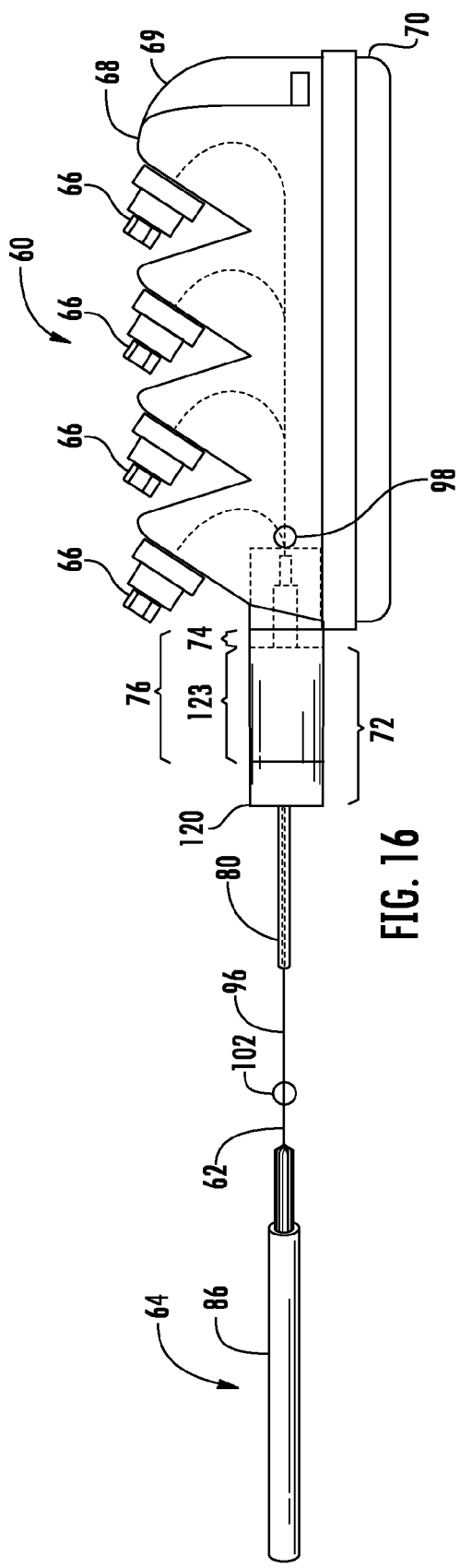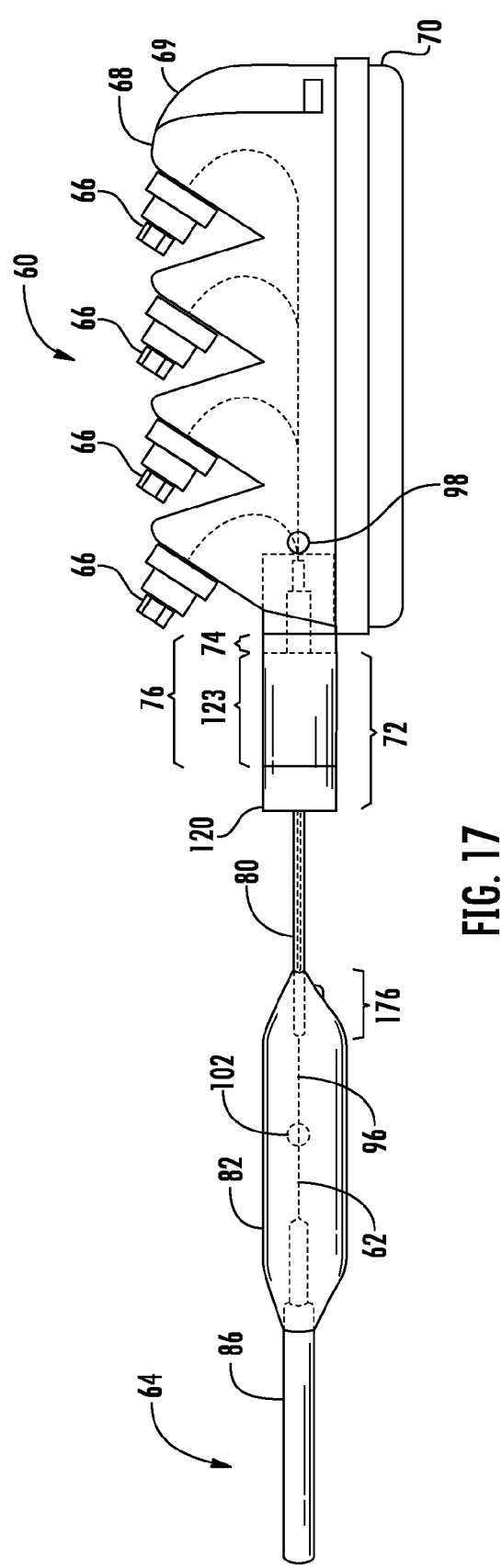

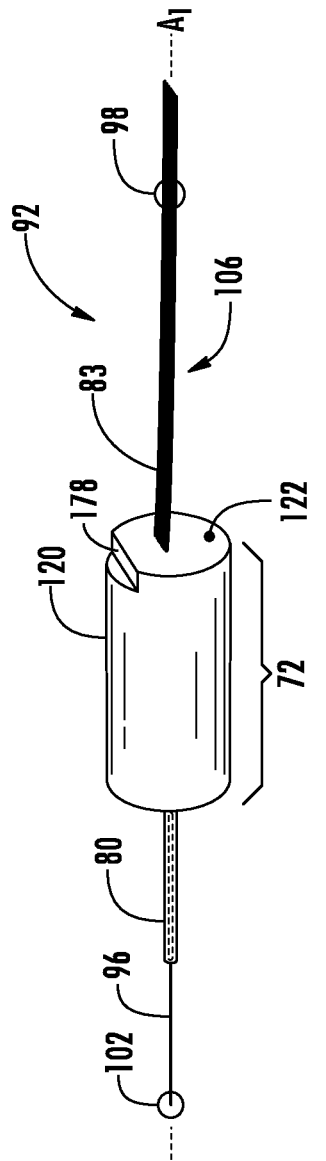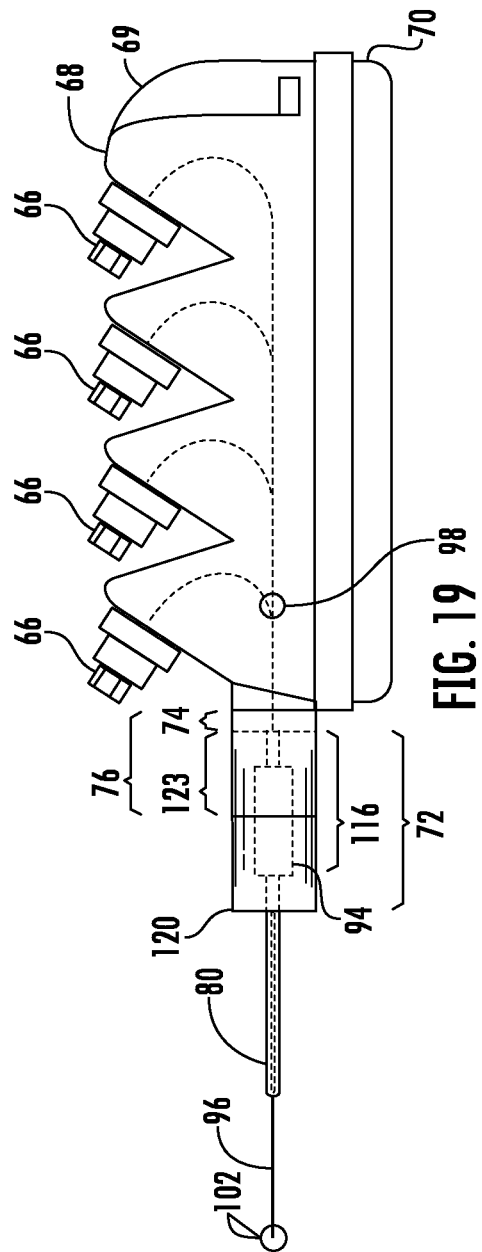

MULTI-PORT OPTICAL CONNECTION TERMINAL ASSEMBLIES SUPPORTING OPTICAL SIGNAL SPLITTING, AND RELATED TERMINALS AND METHODS

RELATED APPLICATIONS

This application claims the benefit of priority under 35 U.S.C. §119 of U.S. Provisional Application Ser. No. 61/503,173 filed on Jun. 30, 2011, the content of which is relied upon and incorporated herein by reference in its entirety.

BACKGROUND

1. Field of the Disclosure

The technology of the disclosure relates to multi-port optical connection terminals and assemblies which may be used to distribute optical signals from optical fibers.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. Fiber optic communications networks also include a number of connection terminals, examples of which include, but are not limited to, network access point (NAP) enclosures, aerial closures, below grade closures, pedestals, optical network terminals (ONTs), and network interface devices (NIDs). In certain instances, the connection terminals include connector ports or nodes, typically opening through an external wall of the connection terminal. The connection terminals are used to establish optical connections between optical fibers terminated from the distribution cable and respective optical fibers of one or more drop cables, extended distribution cables, tether cables or branch cables, collectively referred to herein as "drop cables," unless specified otherwise. The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

In conventional FTTx deployments depicted in FIG. 1, a fiber optic network 10 is provided. The fiber optic network 10 typically delivers service to subscribers 12 through optical fiber distribution cables 14 and subscriber cables 16. For example, the fiber optic network 10 may begin at a trunk cable 18 originating from a central office 20 leading to a splitter/splice cabinet 22 in the field where a distribution cable 14 is connected. The distribution cable 14 may then be routed aerially or below ground through the residential neighborhood served by the fiber optic network 10. The subscriber cables 16 servicing individual subscribers 12 may be connected with the distribution cable 14 through terminations at mid-span access points 24, branch cables 26, connector ports 28 of multi-port splitter boxes 30, and cables 32.

FIGS. 2A to 2B depict a conventional multi-port splitter box 30 including a base 34, cover 36, and eight (8) connector ports 28. Although eight (8) connector ports 28 are shown in FIGS. 2A and 2B, multi-port splitter box 30 may have any number of connector ports 28. An optical management shelf 38 is installed into the multi-port splitter box 30 that includes an optical splitter 40 and a splice protector 42 attached to its top surface 44. An optical fiber 46 of a cable 32 enters an entry orifice 48 of the multi-port splitter box 30 and wraps around containment surfaces 50 around an orifice 52 in the top surface 44 of the optical management shelf 38. The optical fiber 46 may be spliced to an input optical fiber 54 in the splice protector 42. The input optical fiber 54 is attached to the optical splitter 40 which may have output optical fibers 56. The output optical fibers 56 include connectors 58 attached to their distal ends which may be subsequently attached to the connector ports 28 of the multi-port splitter box 30.

In general, the performance of input optical fiber 54, the output optical fibers 56, and the optical splitter 40 can be affected by mechanical and environmental issues surrounding the output splitter box 30. Mechanical issues may include small-radius bends and cyclical and episodic movements of the optical fibers. For example, standard single-mode fiber may experience high optical attenuation at small-radius bends. Environmental issues may be water when the output splitter box 30 is installed underground. Thus, the conventional approach has been to locate the input optical fiber 54, output optical fibers 56, and the optical splitter 40 inside of the output splitter box 30. This conventional approach has resulted in the multi-port splitter box 30 becoming too large in many cases for installation in the field. Ideally, the multi-port splitter box 30 should be sufficiently small in size to be able to pass through ducts and small passageways underground during installation to service subscribers 12, as an example.

SUMMARY OF THE DETAILED DESCRIPTION

Embodiments disclosed in the detailed description include multi-port optical connection terminal assemblies, related terminals and methods. In one embodiment, a multi-port optical connection terminal assembly is disclosed. This multi-port optical connection terminal assembly may include an enclosure including an internal cavity, an input orifice, and a plurality of optical connection nodes. The multi-port optical connection terminal assembly may also include an optical splitter comprising a body, an input optical fiber, and plurality of output optical fibers. At least a portion of the body of the optical splitter may be disposed outside the internal cavity of the enclosure. The input optical fiber of the optical splitter may be disposed outside the internal cavity of the enclosure, and the plurality of the output optical fibers of the optical splitter may be disposed inside the internal cavity. In this manner, the enclosure of the multi-port optical connection terminal assembly is not required to be sized to completely contain the optical splitter. In this regard as a non-limiting example, the enclosure of the multi-port optical connection terminal may be provided of a smaller size enabling easier installation through narrow passageways and ducts because of the smaller enclosure size.

In another embodiment, a multi-port optical connection terminal assembly is provided. The multi-port optical connection terminal assembly may comprise an enclosure, an optical splitter, and a splice point. The enclosure may comprise an internal cavity, an input orifice, and a plurality of optical connection nodes. The optical splitter may comprise a body, an input optical fiber extending from the body, and plurality of output optical fibers extending from the body. The splice point may be located on the input optical fiber and configured to contact an optical fiber of a cable. A portion of the body of the optical splitter may be disposed between the splice point and the enclosure. The plurality of the output optical fibers may be disposed inside the internal cavity, and the input optical fiber may be located outside the internal cavity. In this manner, the multi-port optical connection terminal assembly may, for example, have a smaller size enabling it to be installed through narrow passageways and ducts because of the smaller enclosure.

In another embodiment, a method of assembling a multi-port optical connection terminal assembly is disclosed. This method may be comprised of providing an optical splitter comprising a body, an input optical fiber, and a plurality of output optical fibers. This method may also comprise providing an enclosure comprising an internal cavity, an input orifice, and a plurality of optical connection nodes. In a later step of the method, a furcation structure may be created. Next, the method may also comprise a step to attach the furcation structure to the enclosure. Finally, the enclosure may be sealed with a cover of the enclosure. At least a portion of the body of the optical splitter may be disposed outside the internal cavity of the enclosure. The input optical fiber may be disposed outside the internal cavity of the enclosure, and the plurality of output optical fibers may be disposed inside the internal cavity. In this manner, the method of assembling the multi-port optical connection terminal assembly may, for example, be less expensive to manufacture because of the smaller enclosure.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 3B depicts an exploded view of the multi-port optical connection terminal assembly of FIG. 3A;

FIG. 5A is a perspective, close-up view of the optical splitter of FIG. 3A;

FIG. 5B is a perspective, close-up view of the enclosure of FIG. 3A;

FIG. 6 illustrates a perspective view of an input optical fiber and output optical fibers of the optical splitter of FIG. 3A, and a protective jacket disposed around at least a portion of the input optical fiber of the optical splitter and protective jackets around at least a portion of the output optical fibers of the optical splitter;

FIG. 11 depicts a side view of the furcation structure of FIG. 10, wherein a second protective tube is disposed around at least a portion of the furcation tube and a portion of the enclosure;

FIG. 12 illustrates a side view of the second protective tube securely attached to the portion of the furcation tube and the portion of the enclosure of FIG. 11;

FIG. 16 depicts a side view of the multi-port optical connection terminal assembly of FIG. 15 optically attached to the optical fiber of the cable;

FIG. 17 depicts a side view of the multi-port optical connection terminal assembly of FIG. 16 with a splice protector disposed around a splice point of the input optical fiber of the optical splitter;

FIG. 18 illustrates a perspective view of another embodiment of a furcation structure including one or more interface surfaces; and FIG. 19 depicts a side view of a different embodiment of a furcation structure installed as part of a multi-port optical connection terminal assembly wherein a body of the optical splitter is disposed outside the internal cavity.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include multi-port optical connection terminal assemblies, related terminals and methods. In one embodiment, a multi-port optical connection terminal assembly is disclosed. This multi-port optical connection terminal assembly may include an enclosure including an internal cavity, an input orifice, and a plurality of optical connection nodes. The multi-port optical connection terminal assembly may also include an optical splitter comprising a body, an input optical fiber, and plurality of output optical fibers. At least a portion of the body of the optical splitter may be disposed outside the internal cavity of the enclosure. The input optical fiber of the optical splitter may be disposed outside the internal cavity of the enclosure, and the plurality of the output optical fibers of the optical splitter may be disposed inside the internal cavity. In this manner, the enclosure of the multi-port optical connection terminal assembly is not required to be sized to completely contain the optical splitter. In this regard as a non-limiting example, the enclosure of the multi-port optical connection terminal may be provided of a smaller size enabling easier installation through narrow passageways and ducts because of the smaller enclosure size.

Figure 1:
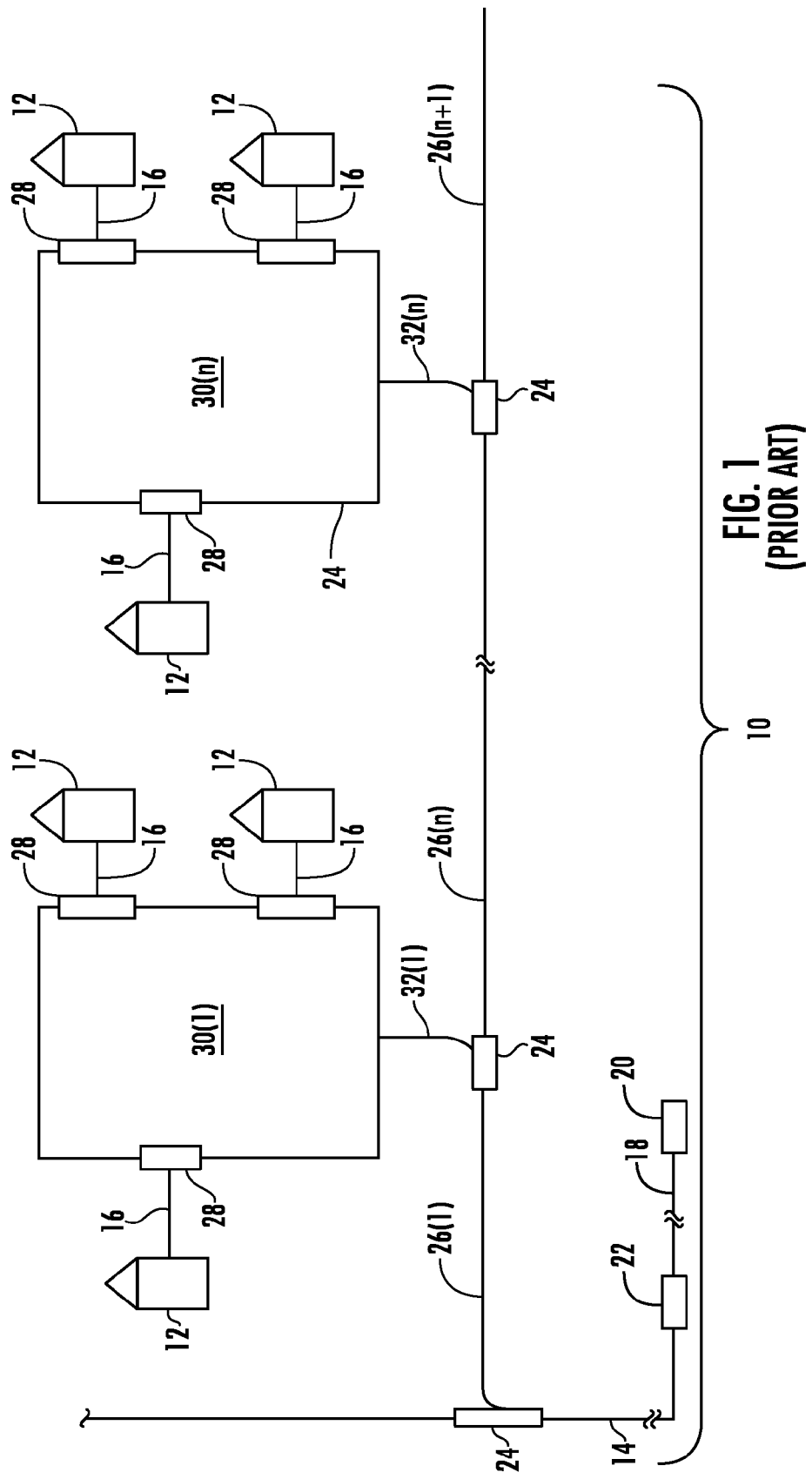
FIG. 1 is a schematic diagram of subscribers of a fiber optic network connected to a distribution cable with multi-port splitter assemblies and cables in the prior art.
Figure 2A:
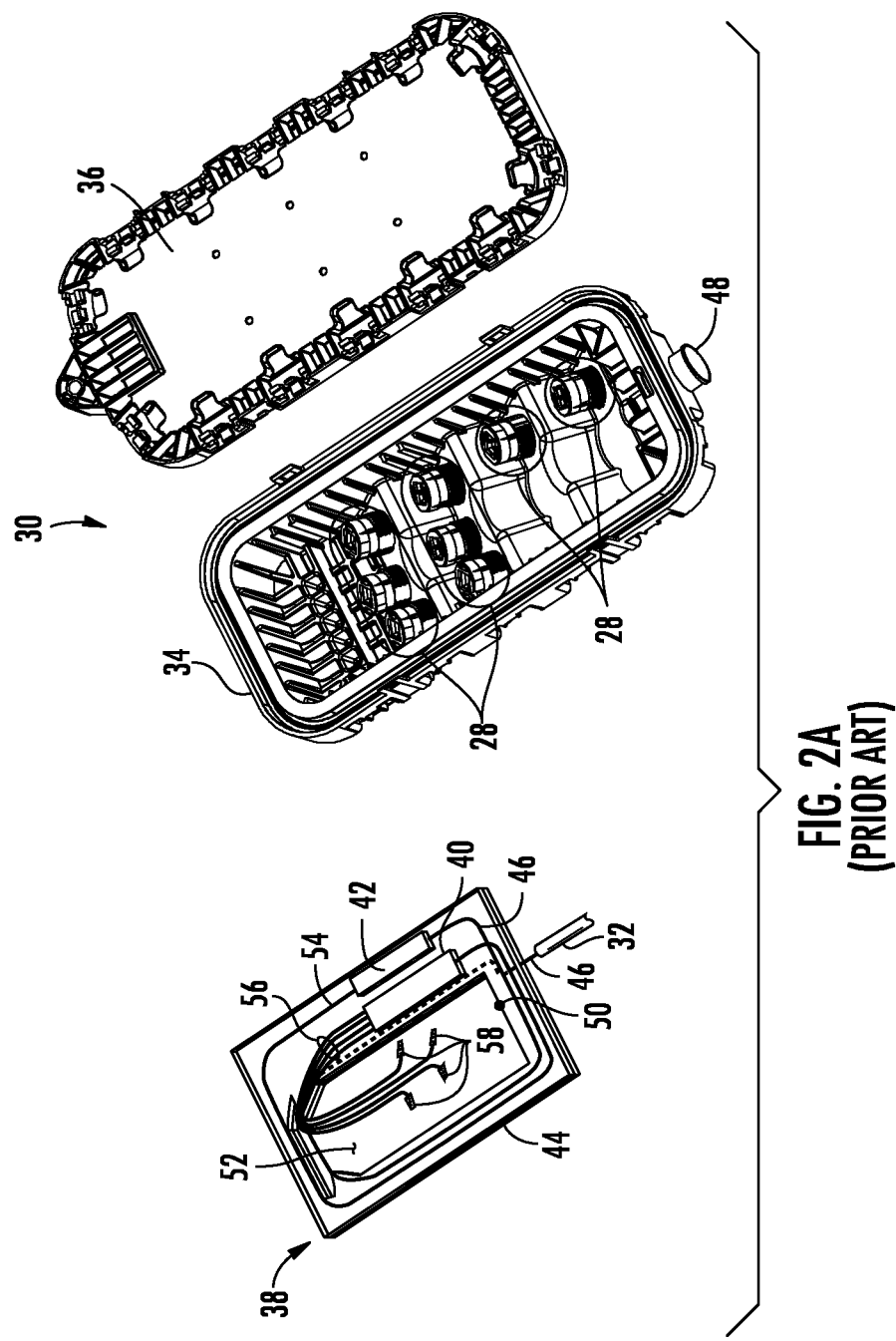
FIG. 2A is a perspective view illustrating a multi-port splitter assembly in the prior art, with an optical management shelf removed.
Figure 2B:
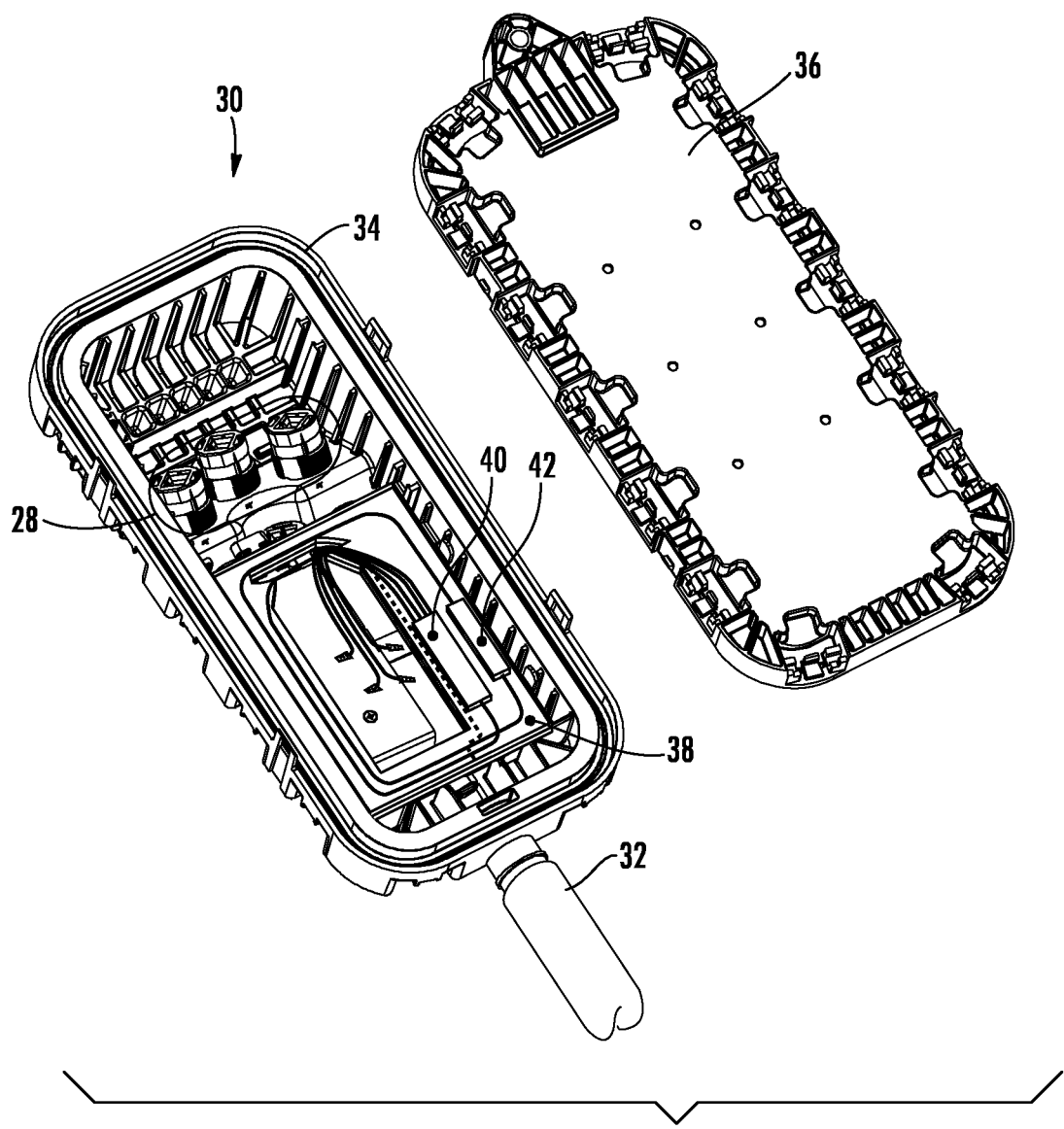
FIG. 2B is a perspective view of the multi-port splitter assembly of FIG. 2A in the prior art, with an optical management shelf installed.
Figure 3A:
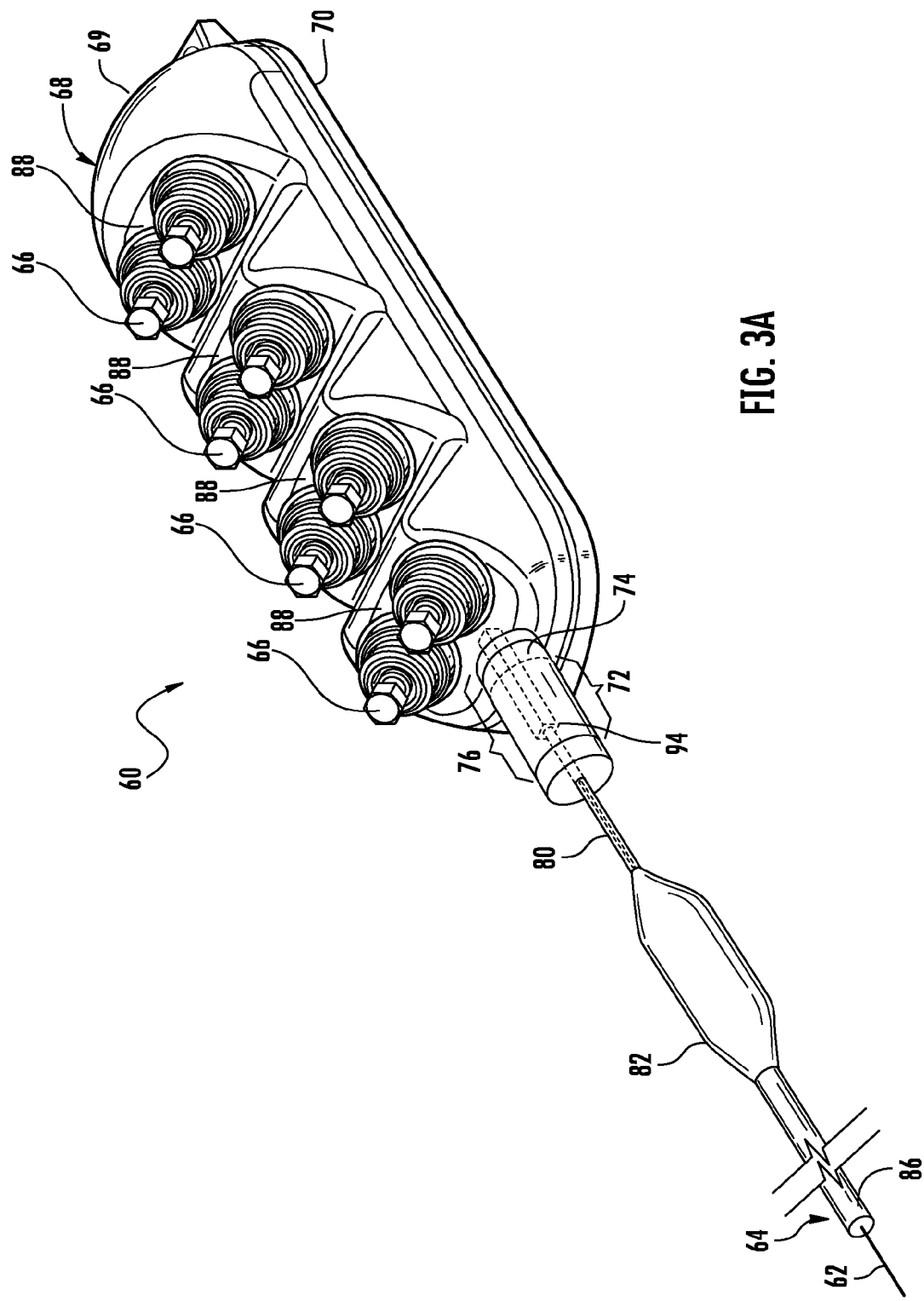
FIG. 3A illustrates a perspective view of an exemplary multi-port optical connection terminal assembly optically connected to a cable.

In this regard, FIGS. 3A and 3B illustrate a schematic diagram and an exploded view, respectively, of one embodiment of a multi-port optical connection terminal assembly 60. It may be configured to split an optical signal carried by an optical fiber 62 in a cable 64 and deliver a plurality of split optical signals downstream at each of a plurality of optical connection nodes 66. As non-limiting examples, the cable 64 may be a branch cable, distribution cable, a stub cable, tether cable, or any other type of cable. The cable 64 may be unconnectorized as provided in FIGS. 3A and 3B or connectorized in other embodiments. In FIG. 3A the main external components of the multi-port optical connection terminal assembly 60 in this embodiment are depicted. In this embodiment, the multi-port optical connection terminal assembly 60 includes an enclosure 68 which comprises a base 69 and a cover 70. The cover 70 operates as part of the enclosure 68 to seal an internal cavity 78 of the enclosure 68 from the environment outside. Sealing the internal cavity 78 may be important because the multi-port optical connection terminal assembly 60 may be, for example, underground or suspended from a utility pole.

A furcation structure 72 may be attached to a portion 74 of the enclosure 68 by a second protective tube 76. This enables at least a portion of a body of an optical splitter (introduced below as element 94) within the furcation structure 72 to be located at least partially outside of the enclosure 68. The furcation structure 72 may be used to reduce the size of the enclosure 68 and to protect the body of the optical splitter outside of the enclosure 68.

A protective jacket 80 extends from the furcation structure 72 towards the cable 64. A splice protector 82 may be disposed between the cable 64 and the protective jacket 80 to optically couple an optical fiber (introduced below) in the protective jacket 80 to the optical fiber 62 of the cable 64. The splice protector 82 may also serve to environmentally protect optical fibers within by forming a tight contact seal with the protective jacket 80 and a cable jacket 86 of the cable 64.

The plurality of optical connection nodes 66 may be attached to a plurality of angled exterior surfaces 88 of the enclosure 68 to allow for optimal orientation of downstream cables and their associated connectors (not shown) to carry the split optical signals downstream from the multi-port optical connection terminal assembly 60 to subscribers.

FIG. 3B provides more detail as to the components of the multi-port optical connection terminal assembly 60. The enclosure 68 may comprise the base 69 and the cover 70. The base 69 and the cover 70 may be formed as thin-walled components made of a strong generally liquid-impermeable material, for example, such as plastic or metal. The base 69 and the cover 70 may be manufactured, for example, using stamping or injection molding techniques as non-limiting examples.

The plurality of optical connection nodes 66 may seal a plurality of output orifices 90 of the enclosure 68. The plurality of output orifices 90 may be disposed in the plurality of angled exterior surfaces 88 as shown in FIG. 3B. The plurality of optical connection nodes 66 may be connected to the plurality of output orifices 90 through, for example, a threaded connection.

The internal cavity 78 may be formed by a volume enclosed by the base 69 and cover 70 and accessible when the cover 70 is attached by fasteners, as a non-limiting example, screws 140, or welded, for example by an induction process. Although the plurality of output orifices 90 and the input orifice 138 are depicted in FIGS. 3A to 3B as being within the base 69 of the enclosure 68, some or all of the plurality of output orifices 90 and the input orifice 138 may also be included as part of the cover 70. It is noted that the cover 70 may be a non-limiting embodiment of the multi-port optical connection terminal assembly 60. Other embodiments of the enclosure 68 may be one-piece, or have the cover 70 permanently attached or otherwise secured to the base 69.

With continuing reference to FIG. 3B, the multi-port optical connection terminal assembly 60 may utilize an optical splitter 92 to split optical signals from the optical fiber 62 of the cable 64. The purpose of the optical splitter 92 may be to transmit at least a portion of the optical signal to or from the cable 64 to or from the plurality of optical connection nodes 66. The optical splitter 92 may include a body 94 where the optical signals are split. Each optical fiber may contain many independent channels of information, each having a different wavelength of light. The body 94 of the optical splitter 92 may be compatible with either single-mode fiber optical cables or multi-mode optical cables. The body 94 of the optical splitter 92 may have components to support wave-division multiplexing (WDM), code division multiplexing (CDM), course wave division multiplexing (CWDM), and/or dense wave division multiplexing (DWDM), or other means of managing and/or transmitting optical signals. Many of these data handling approaches may allow for multiple signals to be efficiently transported on a single carrier wave by the optical fiber 62 in the cable 64 before being split by the optical splitter 92 into their component signal parts to be available for downstream optical fibers (not shown) connected at the plurality of optical connection nodes 66. In these approaches, the optical signal available at each of the optical connection nodes 66 may be at least a portion of the multiple signals carried by the optical fiber 62 of the cable 64.

Continuing the discussion of the optical splitter 92, the body 94 may include an optical de-multiplexer comprising thin film filter (TFF) technology; a fiber bragg grating (FBG) with optical circulators; and/or arrayed waveguide gratings (AWG). The body 94 of the optical splitter 92 may have a rectangular cross-section as shown in FIG. 3B. Alternatively, other cross section shapes may be utilized, such as an oval-type, or polygon-type.

The optical splitter 92 may also include one or more input optical fibers 96 and a plurality of output optical fibers 98 connected directly to the body 94 of the optical splitter 92. The input optical fiber 96 may be a single-mode or multi-mode optical fiber extending from an input end 100 of the body 94 of the optical splitter 92. A splice point 102 may be disposed on the input optical fiber 96, where the input optical fiber 96 may be optically coupled to the optical fiber 62 of the cable 64. The optical coupling (also known as splicing) may be accomplished mechanically or by fusing the optical fibers 62, 96 together. Note that the terms "input" output fiber and "output" optical fiber are not limited to and do not imply a limitation of a direction of optical signals. The optical splitter 92 may be configured such that optical signals can flow unidirectional in either direction, or bi-directionally between the input optical fiber 96 and the output optical fibers 98. All possibilities are contemplated by the optical splitter 92 and the optical splitters disclosed herein.

The input optical fiber 96 of the optical splitter 92 may include a protective jacket between the splice point 102 and the body of the optical splitter 92 for additional environmental and mechanical protection. In this regard, the protective jacket 80 may be disposed between the input optical fiber 96 and the body 94 of the optical splitter 92 to help provide additional protection. The protective jacket 80 may be oval, round, or any other geometry in cross-section with an orifice through the axis by which may be disposed a portion 103 of the input optical fiber 96. The protective jacket 80 may abut the input end 100 of the body 94 of the optical splitter 92 to provide protection adjacent to the body 94. Mechanical protection of the input optical fiber 96 may be particularly important next to the body 94, because the body 94 may be rigid and accordingly, bending forces transmitted from the cable 64 may cause a sharp bend in the input optical fiber 96 that may cause optical attenuation or damage. For example, traditional optical fibers could suffer optical attenuation for certain bend radii.

The optical fiber 62 of the cable 64 may include the cable jacket 86, as previously discussed, to protect the optical fiber 62 from environmental issues. The cable jacket 86 may be partially stripped from a terminating end 104 of the cable 64 to expose the optical fiber 62 that may be subsequently spliced to the input optical fiber 96. Accordingly, a splice protector 82 may be utilized to protect the splice point 102 and the terminating end 104 of the cable 64. The splice protector 82 may be comprised of one or more components 82(1), 82(2) or may be formed as a single overmolded component surrounding the splice point 102 and the terminating end 104. The advantage of being a single overmolded component may be that a tight seal may be formed around the splice point 102.

The plurality of output optical fibers 98 extend from the body 94 of the optical splitter 92 at an output end 106 of the body 94. Individual ones of the plurality of output optical fibers 98 may be inside a respective protective jacket in the form of a buffer tube 83, as a non-limiting example, a 900 µm buffer tube, also referred to as a "loose tube." In other words, a separate protective jacket 83 may be disposed around an individual output optical fiber 98. The protective jacket 83 on an output optical fiber 98 may extend over or disposed around a portion 117 of the output fiber 98. However, the protective jacket 83 may not contact the splitter body 94, but may need to be a short distance away from the splitter body 94 to avoid optical signal attenuation. The protective jacket on the output optical fiber protects the optical fibers from abrasion when the multiport is being handled and aids in the connectorization of the output fibers.

The plurality of output optical fibers 98 deliver the output signals of the optical splitter 92 to the plurality of optical connection nodes 66, and may be comprised of single-mode or multi-mode optical fibers. In a non-limiting example, the plurality of output optical fibers 98 may be in the form of a fiber optic ribbon cable wherein each of the plurality of output optical fibers 98 may exit the body 94 of the optical splitter 92 in an array of optical fibers "m" (m) fibers high and "n" (n) fibers across, or in other words ("m×n"). Typical non-limiting values for "m" and "n" may be positive integers 1, 2, 3. Other output configurations and quantities of the plurality of output optical fibers 98 may also occur. The plurality of output optical fibers 98 may also include a protective cable jacket (not shown) to protect the plurality of output optical fibers 98 between the body 94 and the plurality of optical connection nodes 66. Each of the plurality of output optical fibers 98 may also comprise a plurality of optical fiber connectors 108 to connect the plurality of output optical fibers 98 to the plurality of optical connection nodes 66. The advantage of having optical fiber connectors 108 may be that the plurality of output optical fibers 98 may have the optical fiber connectors 108 attached in a facility enabling easier utilization in the field.

An output strain relief device 107 may be attached to the output end 106 of the body 94. The output strain relief device 107 may be utilized to protect the plurality of output optical fibers 98 from being bent more than the minimum bend radius of the plurality of output optical fibers 98 that may be allowed before damage or unacceptable optical attenuation occurs.

As to the topic of attaching components of the multi-port optical connection terminal assembly 60, a protective tube 110 may be used to attach the protective jacket 80 to the body 94 of the optical splitter 92. The protective tube 110 may be in a cylindrical form and comprise an orifice surface 112, which may be concentric around a longitudinal axis $A_1$ of the protective tube 110. A portion 114 of the protective jacket 80 and a portion 116 of the body 94 of the optical splitter 92 may form the attachment with the orifice surface 112 of the protective tube 110. A tight attachment between the protective tube 110 and the portions 114, 116 may be optionally enhanced by an inclusion of an adhesive lining 118 upon the orifice surface 112 of the protective tube 110. The adhesive lining 118 may comprise epoxy or another adhesive compatible with plastic, rubber, or metal, such as aluminum for example.

Moreover, the protective tube 110 may be sensitive to heat wherein, upon heating above a specified temperature, a material of the protective tube 110 may constrict, causing the protective tube 110 to tighten around the portions 114, 116 and thereby increase a frictional and/or chemical attachment strength between the orifice surface 112 and the portions 114, 116. The protective tube 110 may be made from a strong tear-resistant material such as metal or plastic. The protective tube 110 may be a heat shrink tube.

Also, a furcation tube 120 in combination with a potting compound 122 (discussed below in regard to FIG. 9) may provide further strength and rigidity to the attachment between the protective tube 110 and the portions 114, 116. A portion 123 of the furcation tube 120 may be attached to the enclosure 68 through the second protective tube 76. The furcation tube 120 in this embodiment comprises a second orifice surface 124 which may be concentric around a longitudinal axis $A_1$ of the furcation tube 120. The furcation tube 120 may surround at least a portion of the protective tube 110, as well as the portions 114, 116. The potting compound 122 may be disposed between the furcation tube 120, specifically the second orifice surface 124, and the protective tube 110. The furcation tube 120 may be made of metal or plastic, for example, that may be strong and tear-resistant. The potting compound 122 may be comprised of epoxy or a different potting compound compatible with metal and/or plastic.

In order to simplify the subsequent discussion, the furcation structure 72 describes the strengthened attachment between the body 94 of the optical splitter 92, the protective jacket 80, and the associated components required to attach this strengthened attachment to the enclosure 68. The furcation structure 72 may be comprised of the furcation tube 120, the potting compound 122, the protective tube 110, the portion 114 of the protective jacket 80 and the portion 116 of the body 94 of the optical splitter 92.

Next, the furcation tube 120 of the furcation structure 72 may be attached to the enclosure 68. The second protective tube 76 may be utilized to attach the furcation tube 120 to the portion 74 of the enclosure 68. The portion 74 of the enclosure 68 may be an outer surface of a neck portion protruding as part of the enclosure 68, and thereby provide a convenient surface for attachment as shown in FIG. 3B.

Moreover, the second protective tube 76 may be in cylindrical form and comprise a third orifice surface 128 which may be concentric around a longitudinal axis $A_1$ of the second protective tube 76. The portion 123 of the furcation tube 120 and the portion 74 of the enclosure 68 come into contact with the third orifice surface 128 to form an attachment. A tight attachment between the third orifice surface 128 of the second protective tube 76 and the portion 123 of the furcation tube 120 and the portion 74 of the enclosure 68 may be enhanced by an inclusion of a second adhesive lining 130 along the third orifice surface 128 of the second protective tube 76. The second adhesive lining 130 may comprise epoxy or another adhesive compatible with plastic, rubber, or metal, such as aluminum for example. The material of the second protective tube 76 may be a strong tear-resistant material and may be different than the material of the protective tube 110. Examples of suitable materials are metal or plastic.

The second protective tube 76 may be sensitive to heat, wherein upon heating above a specified temperature, the second protective tube 76 may constrict causing the second protective tube 76 to tighten around the portion 123 of the furcation tube 120 and the portion 74 of the enclosure 68, and thereby increase the strength of the attachment between the third orifice surface 128 and the portion 123 of the furcation tube 120 and the portion 74 of the enclosure 68. The second protective tube 76 may be a heat shrink tube.

The attachment between the furcation structure 72 and the enclosure 68 may be enhanced by a clamp 132 attached to the furcation structure 72 or a second portion 136 of the body 94 of the optical splitter 92 with a fastener 134, as a non-limiting example. The clamp 132 may be located inside the internal cavity 78 of the enclosure 68 for protection against environmental and mechanical issues. The clamp 132 may be attached itself to the enclosure 68, or alternatively may merely form an interference fit with the enclosure 68 to thereby prevent the furcation structure 72 from separating from the enclosure 68.

The second portion 136 of the body 94 of the optical splitter 92 may or may not be located within the internal cavity 78 of the enclosure 68. In embodiments where the optical splitter 92 is located within, the optical splitter 92 may enter the internal cavity 78 at the input orifice 138 of the enclosure 68.

The cover 70 may be fastened to the base 69 with one or more fasteners 140 to make up the enclosure 68. The cover 70 may include seals (not shown) to form a tight protective attachment with the enclosure 68 and thereby help better isolate the internal cavity 78 of the enclosure 68 from the outer environment. The seals may prevent contaminants such as liquid from entering the interior cavity 78. Other methods for fastening may also be employed which do not employ fasteners, such as induction welding, sonic welding, and chemical bonding, as non-limiting examples.

Figure 4:
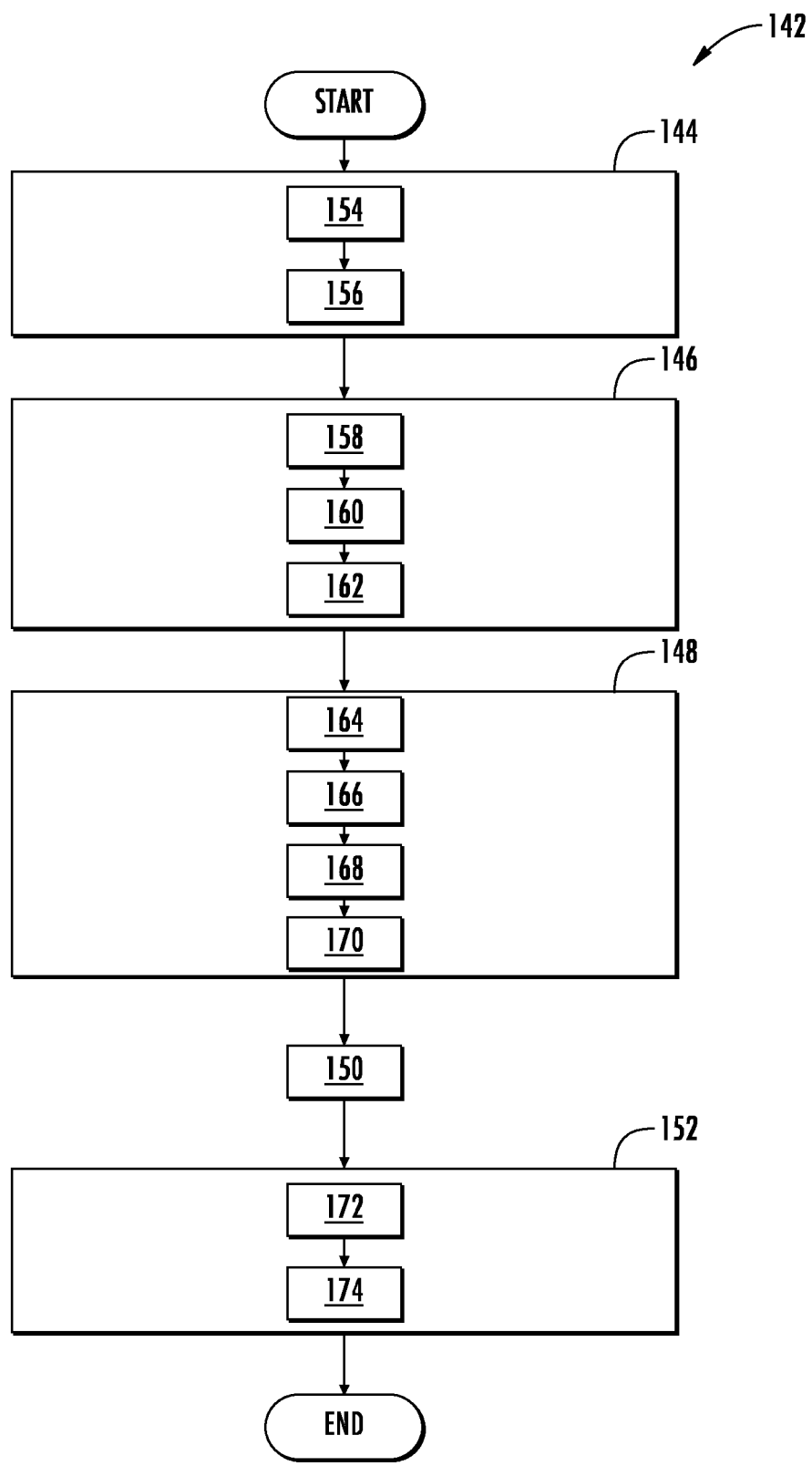
FIG. 4 is a flowchart diagram illustrating an exemplary process that may be employed to manufacture and/or assemble the multi-port splitter assembly of FIG. 3A.

FIG. 4 depicts an exemplary method 142 of assembling a multi-port optical connection terminal assembly as depicted in FIGS. 3A to 3B. The first step of the method 142 may be comprised of providing the optical splitter 92 and the enclosure 68 (step 144 in FIG. 4). Next, the furcation structure 72 may be created (step 146). In the next step the furcation structure 72 may be attached to the enclosure 68 (step 148). Once these are completed, then the enclosure 68 may be sealed with the cover 70 of the enclosure 68 (step 150). Lastly, the input optical fiber 96 may be optically coupled to an optical fiber 62 of the cable 64 at the splice point 102 disposed in the input optical fiber 96 (step 152). Each of these steps will be discussed in more detail below with continuing reference to FIGS. 5A to 19.

In this regard, FIGS. 5A to 5B illustrate details of providing the optical splitter 92 and the enclosure 68 (step 144 in FIG. 4) in two sub-steps. A first sub-step 154 in FIG. 5A may consist of providing the optical splitter 92, which may comprise a body 94, an input optical fiber 96, and a plurality of output optical fibers 98. A second sub-step 156, depicted in FIG. 5B, may consist of providing the enclosure 68 comprising the base 69, the cover 70, the internal cavity 78, the input orifice 138, and the plurality of optical connection nodes 66.

Next, FIG. 6 illustrates a first sub-step 158 of creating the furcation structure (step 146). The purpose of the furcation structure 72 may be to locate at least a portion of the body 94 of the optical splitter 92 outside of the enclosure 68 so that the multi-port optical connection terminal assembly 60 may be smaller in size while providing sufficient protection for the body 94 of the optical splitter 92. In sub-step 158, the protective jacket 80 may be disposed around at least the portion of the input optical fiber 96 and abutted against the input end 100 of the body 94 of the optical splitter 92. The input optical fiber 96 may extend outside the body 94 of the optical splitter 92 from the input end 100 of the body 94 of the optical splitter 92. In addition, as part of sub-step 158, protective jackets may be placed around the output optical fibers 98.

Figure 7:
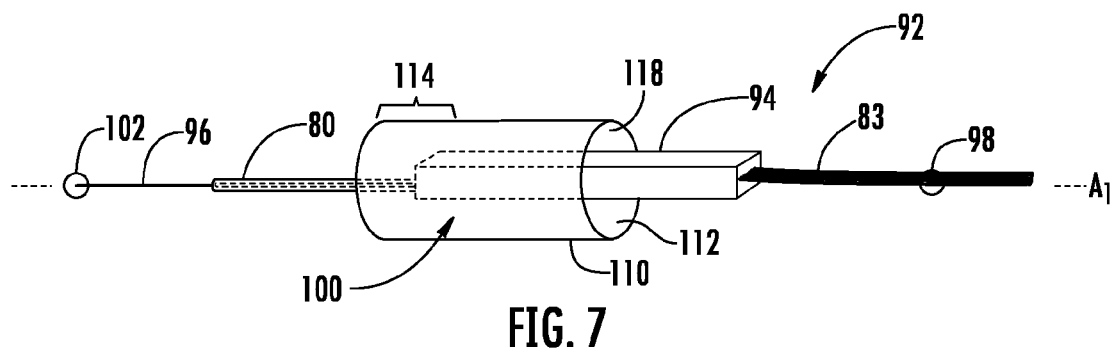
FIG. 7 depicts a perspective view of a protective tube disposed around a portion of the protective jacket and the input end of the optical splitter of FIG. 6.

Continuing with step 146 in FIG. 4, FIG. 7 illustrates a second sub-step 160 of creating the furcation structure 72, wherein the protective tube 110 may be disposed around at least the portion 114 of the protective jacket 80 and the input end 100 of the body 94 of the optical splitter 92. The protective tube 110 may be configured to attach the protective jacket 80 to the input end 100 of the body 94 of the optical splitter 92.

In the case that the protective tube 110 is a heat shrink tube, then heat may be applied above a specified temperature to the protective tube 110. The heat may tighten the protective tube 110 around the portion of the protective jacket 114 and the input end 100 of the body 94 of the optical splitter 92. The tightening may increase the strength of the attachment between the portion of the protective jacket 114 and the input end 100 of the body 94. The advantage of using a heat shrink tube may be that it may be installed quickly, with low cost, and has sufficient strength.

Figure 8:
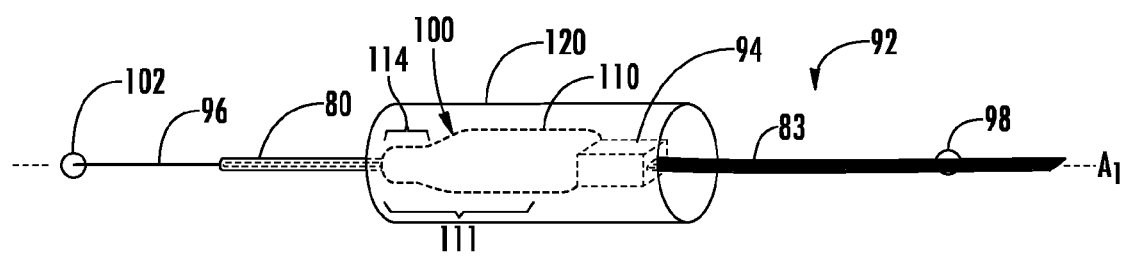
FIG. 8 illustrates a perspective view of a furcation tube disposed around the protective tube, the input end and output end of the body of the optical splitter, and the portion of the protective jackets around the input optical fiber and the output optical fibers of FIG. 7.
Figure 9:
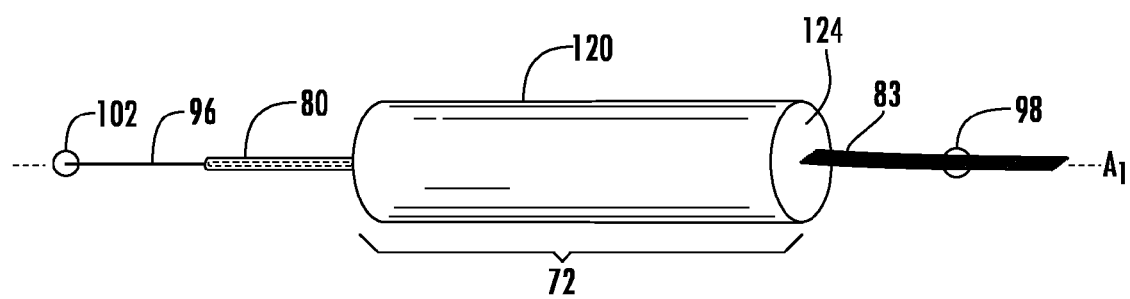
FIG. 9 depicts a perspective view of a furcation structure comprising the furcation tube of FIG. 8.

With regard to step 146 in FIG. 4, FIGS. 8 to 9 illustrate a third sub-step 162 of creating the furcation structure. The purpose of this third sub-step may be to further protect the input optical fiber 96 and a portion of the body 94 of the optical splitter 92 by creating a larger rigid structure. In this sub-step 162, the protective jackets 80 may be bound to the body 94 of the optical splitter 92 by disposing the furcation tube 120 around the at least the portion 111 of the protective tube 110, the input end 100 of the body 94 of the optical splitter 92, the output end 107 of the body 94 of the optical splitter 92, and the at least the portion 114 of the protective jacket 80 around the input optical fiber and at least a portion 117 the protective jackets 83 around the output optical fibers 98. Next, the potting compound 122 may be disposed inside the furcation tube 120 and around at least a portion 111 of the protective tube 110. The potting compound 122 may be, for example, epoxy or another substance providing a high rigidity when cured.

Figure 10:
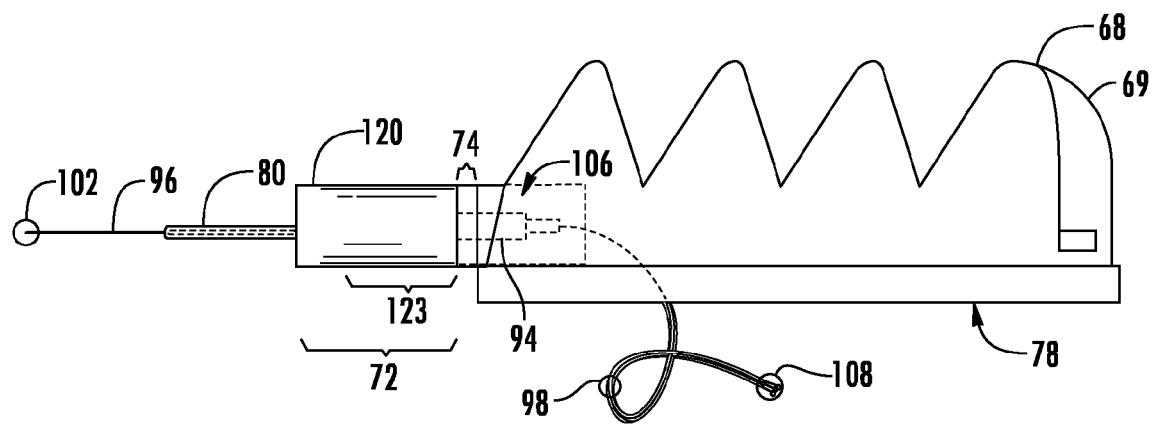
FIG. 10 illustrates a side view of the furcation structure of FIG. 9, wherein an output end of the body of the optical splitter is disposed within the enclosure of FIG. 3A.

With regard to step 148 in FIG. 4, FIG. 10 illustrates a first sub-step 164 of attaching the furcation structure 72 to the enclosure 68. The purpose of sub-step 164 may be to protect the output end 106 of the body 94 of the optical splitter 92. In sub-step 164, the output end 106 of the body 94 of the optical splitter 92 may be disposed within the internal cavity 78 of the enclosure 68. The plurality of output optical fibers 98 may extend outside the body 94 of the optical splitter 92 from the output end 106 of the body 94 of the optical splitter 92. Although embodiments of the multi-port optical connection terminal assembly 60 may seek to minimize the volume of the internal cavity of the enclosure 68 to save space, having the output end 106 of the optical splitter 92 disposed within the enclosure 68 has two advantages. First, the output end 106 is better protected within the internal cavity 78 of the enclosure 68. The second is that the furcation structure 72 may be made shorter in the longitudinal direction. Thus, when the furcation structure 72 is rigidly connected to the enclosure 68 as a cantilever, there may be less risk of breakage from accidental impacts during handling or transportation.

In the second sub-step of step 148 in FIG. 4, FIGS. 11 to 12 illustrate a second sub-step 166 of attaching the furcation structure 72 to the enclosure 68. The purpose of sub-step 166 may be to both attach the body 94 of the optical splitter 92 to the enclosure 68 and to close the input orifice 138 of the enclosure 68. In sub-step 166, the second protective tube 76 may be disposed around at least the portion 123 of the furcation tube 120 and the portion 74 of the enclosure 68 to begin to form the attachment. FIG. 12 depicts the second protective tube 76 securely attached to the portion 123 of the furcation tube 120 and the portion 74 of the enclosure 68. This secure attachment may be the result of changing the shape of the second protective tube 76 by, for example, heating, or by providing a second protective tube 76 with an inner surface closely matching the outer surfaces of the furcation tube 120 and the portion 74 of the enclosure 68. Further, FIG. 12 depicts two separate descriptions of the location of the optical splitter. In the first, at least the portion 116 of the body 94 of the optical splitter 92 may be disposed outside the internal cavity 78 of the enclosure 68 and the plurality of output optical fibers 98 may be disposed inside the internal cavity 78 of the enclosure 68. In the second, the portion 116 of the body 94 of the optical splitter 92 may be disposed between the splice point 102 and the enclosure 68, and the input optical fiber 96 may be located outside the internal cavity 78.

Figure 13:
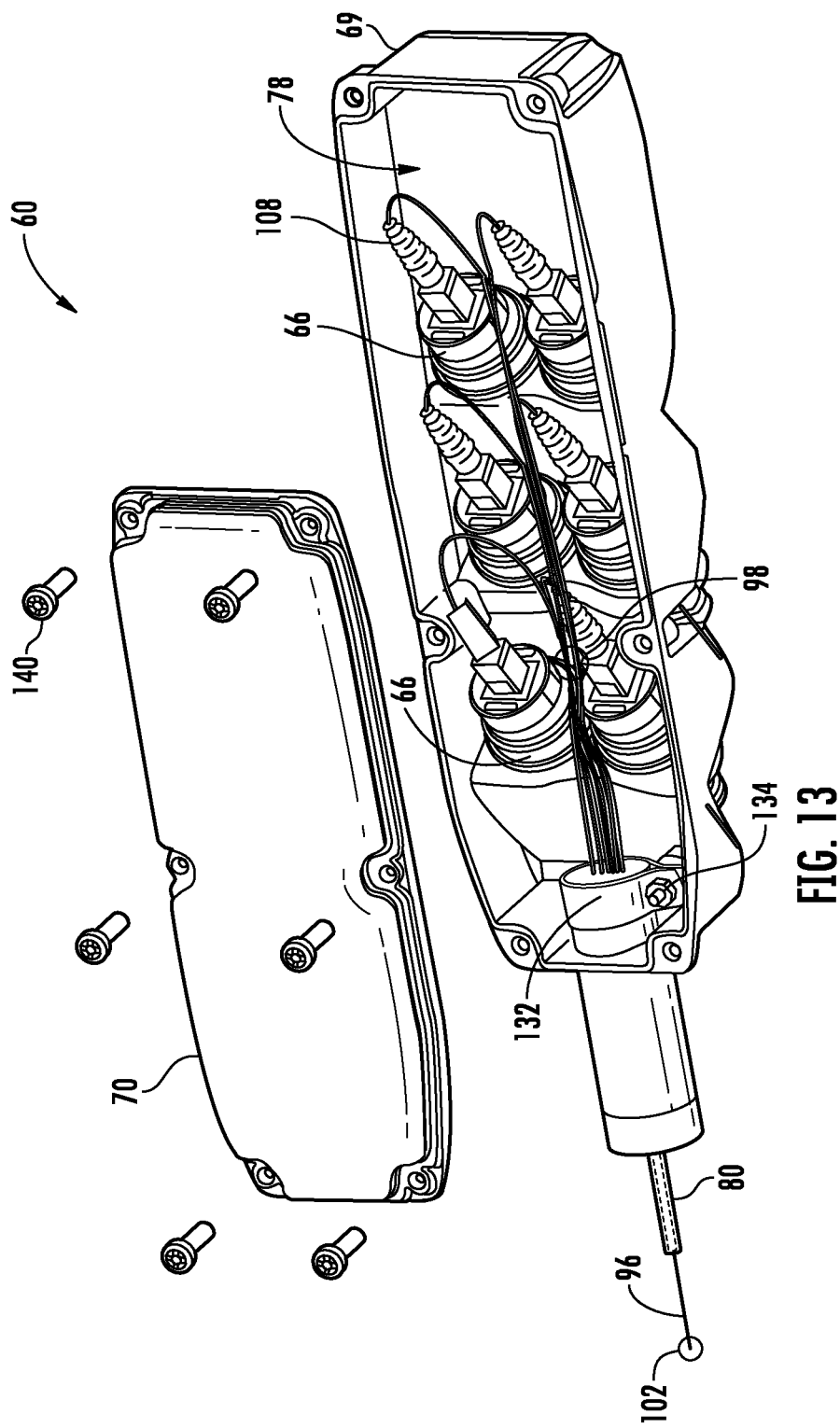
FIG. 13 depicts a perspective view of the bottom of the enclosure illustrating the portion of the furcation tube secured to the enclosure of FIG. 12 with a clamp.

In the third sub-step of step 148 in FIG. 4, FIG. 13 illustrates a third sub-step 168 of attaching the furcation structure 72 to the enclosure 68. The purpose of sub-step 168 may be to further secure the attachment of the body 94 of the optical splitter 92 to the enclosure 68. In sub-step 168 the portion 123 of the furcation tube 120 may be secured to the enclosure 68 with a clamp 132. The clamp 132 may be tightened with the fastener 134 which may be, for example, comprised of a nut and bolt set, or wing nut assembly, as a non-limiting example.

Figure 14:
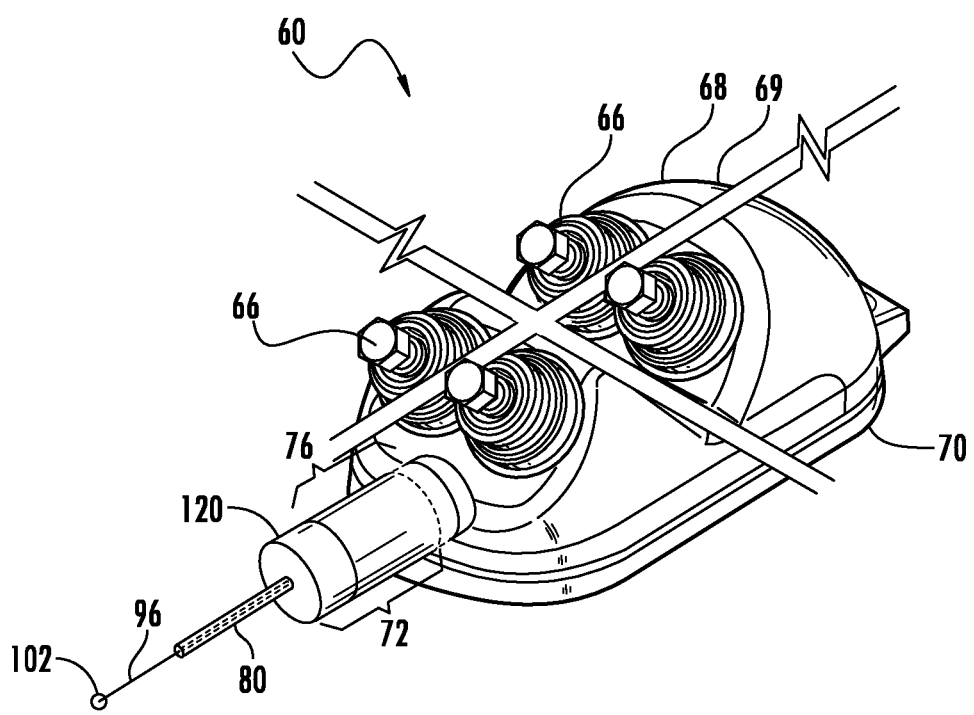
FIG. 14 illustrates a perspective view of alternative embodiments of the multi-port optical connection terminal assembly including various quantities of optical connection nodes.

In the last sub-step 170 of step 148 in FIG. 4, attaching the furcation structure 72 to the enclosure 68 may be shown by continued reference to FIG. 13. The purpose of sub-step 170 may be to optically and/or mechanically couple the plurality of the optical connection nodes 66 to the optical splitter 92. The plurality of the optical connection nodes 66 may be comprised of the plurality of optical fiber connectors 108 and may be optically and/or mechanically connected to each of the plurality of output optical fibers 98. As shown in FIG. 11 and previously discussed, the plurality of optical fiber connectors 108 may be optically attached to the plurality of output optical fibers 98 prior to being attached to the plurality of optical connection nodes 66. Any number of optical connection nodes 66 may be optically coupled downstream from the optical splitter 92 consistent with the method 142 as depicted in FIG. 14. The number of optical connection nodes 66 may be dependent on the number of subscribers serviced, cost, or other installation considerations.

In step 150 in FIG. 4, FIG. 13 further illustrates sealing the enclosure 68 with the cover 70 of the enclosure 68. The purpose of step 150 may be to seal the internal cavity 78 of the enclosure 68 from the outside. For example, the fasteners 140 may be used to seal the cover 70 to the base 69. The multi-port optical connection terminal assembly 60 may be installed either within a sheltered building, underground in a wet trench, or suspended from a utility pole during inclement weather, so sealing the enclosure 68 may be critical. Other components (not shown) may be utilized for sealing the enclosure 68, for example, rubber gaskets placed between the cover 70 and base 69.

FIG. 13 also shows that the plurality of output optical fibers 98 are connected to the plurality of the optical connection nodes 66 without the use of the optical management shelf 38, as may be needed for some current designs. Accordingly, the present embodiment has a lower quantity of parts and thereby may be less expensive to manufacture.

Other non-limiting embodiments to the method 142 are now also disclosed. These embodiments may be beneficial by either further reducing the size of the internal cavity 78 or improving the attachment of the furcation structure 72 to the enclosure 68. For example, one or more interface surfaces 178 may be made in the furcation structure 72 as depicted in FIG. 18. The one or more interface surfaces 178 may be created, for example, by a material removal process at a milling machine. The one or more interface surfaces 178 may be used advantageously to contact complementary surfaces in the portion 74 of the enclosure 68 to further improve attachment by preventing a twist of the furcation structure 72 relative to the enclosure 68. Also, one or more interface surfaces 178 may serve as one or more contact surfaces (not shown) with the clamp 132.

Another non-limiting embodiment to the method 142 comprises disposing the furcation tube 120 and potting compound 122 around the entire body 94 of the optical splitter 92. This embodiment depicted in FIG. 19 enables the furcation structure 72 to be attached to the enclosure 68 so that the body 94 of the optical splitter 92 may be disposed outside the internal cavity 78. In this manner, the size of the internal cavity 78 may advantageously be made even smaller.

Figure 15:
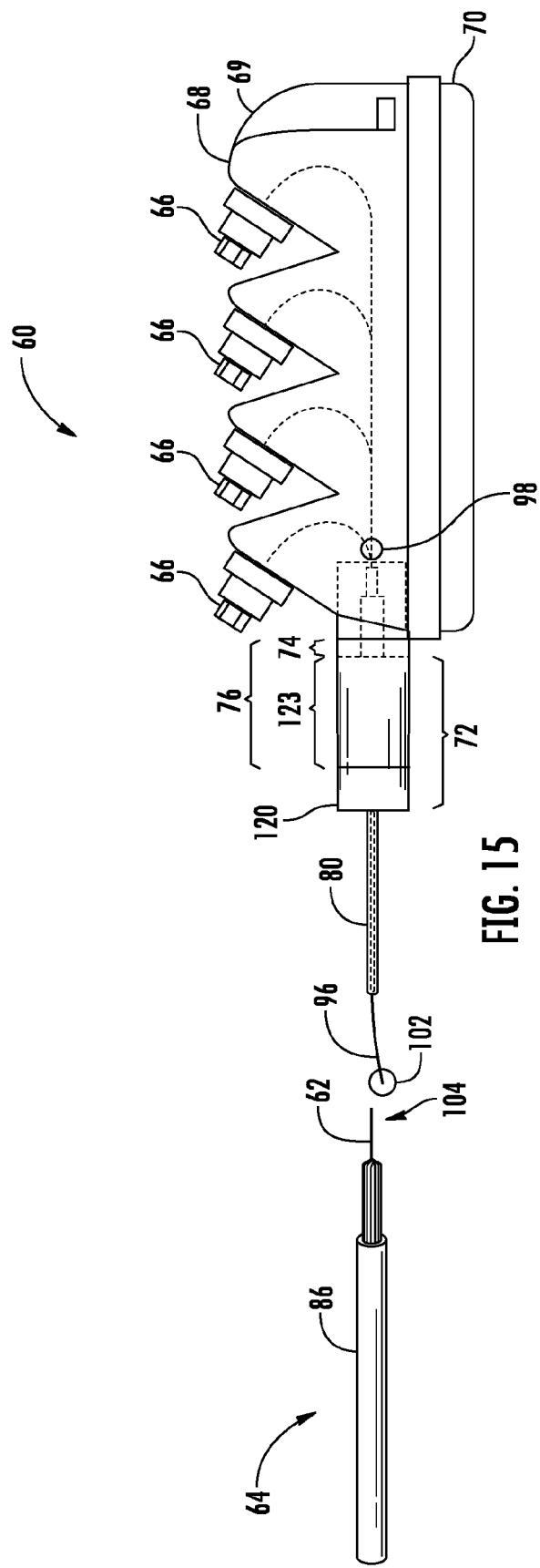
FIG. 15 depicts a side view of the resulting multi-port optical connection terminal assembly of FIG. 13 adjacent to an optical fiber of a cable.

Next, in a first sub-step 172 of step 152 in FIG. 4, FIGS. 15 to 16 illustrate optically coupling the input optical fiber 96 to the optical fiber 62 of the cable 64 at the splice point 102 disposed in the input optical fiber 96. The purpose of first sub-step 172 may be to optically couple the optical fiber 62 of the cable 64 to the optical splitter 92. FIG. 15 depicts the splice point 102 disposed in the input optical fiber 96 and the cable 64 prior to optical coupling. FIG. 16 illustrates the optical fiber 62 of the cable 64 optically coupled to the input optical fiber 96 at the splice point 102. Optically coupling (or splicing) may involve either mechanical splicing or fusion splicing. Mechanical splicing may involve alignment devices (not shown) configured to hold the two fiber ends in a precisely aligned position to enable light to pass from one optical fiber to the other. Fusion splicing may involve splicing equipment (not shown) that precisely aligns the two ends of different optical fibers together and then energy may fuse or weld together these ends. The energy may be provided from an electric arc or other heat source.

Next, in a second sub-step 174 of step 152 in FIG. 4, FIG. 17 illustrates the splice protector 82 disposed around the splice point 102, a second portion 176 of the protective jacket 80, and the cable jacket 86 of the cable 64. The purpose of the second sub-step 174 may be to protect the splice point 102, the input optical fiber 96, and the optical fiber 62 of the cable 64 by keeping out contaminants and preventing harmful bending. At optical coupling locations the input optical fiber 96 and the optical fiber 62 of the cable 64 may be stripped of protective coatings and strength members and thereby may be generally be vulnerable to tensile and bending forces as well as contaminants without the splice protector 82. For example, some unprotected optical fibers may only have a maximum safe tensile strength of 0.5 to 1.5 pounds as a non-limiting example. The splice protector 82 may comprise over-molded plastic, heat shrink tubing, silicone gel, and/or mechanical crimp protectors to keep the splice point 102 protected from outside elements and breakage. Alternative embodiments of the splice protector 82 may allow a second optical fiber (not shown) of the cable 64 to exit the splice protector 82 in parallel to the optical fiber 62 of the cable 64 and be available for optical coupling downstream.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties. Many modifications and other embodiments not set forth herein will come to mind to one skilled in the art to which the embodiments pertain having the benefit of the teachings presented in the foregoing descriptions and the associated drawings. As non-limiting examples, the type of enclosure for the multi-port connector optical connect terminal assembly, number of ports, types of splices, types of splice protections, type of cable, and type and configuration of optical splitters can vary as desired.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A multi-port optical connection terminal assembly, comprising:
    an enclosure including an internal cavity, an input orifice, and a plurality of optical connection nodes; and
    an optical splitter comprising a body, an input optical fiber, and plurality of output optical fibers,
    wherein at least a portion of the body of the optical splitter is disposed outside the internal cavity of the enclosure, the input optical fiber is disposed outside the internal cavity of the enclosure, and the plurality of output optical fibers are disposed inside the internal cavity.

2. The multi-port optical connection terminal assembly of claim 1, wherein the body of the optical splitter is fixed in a stationary relationship to the enclosure.

3. The multi-port optical connection terminal assembly of claim 1, wherein the plurality of output optical fibers extend outside the body of the optical splitter from an output end of the body of the optical splitter, and the input optical fiber extends outside the body of the optical splitter from an input end of the body of the optical splitter.

4. The multi-port optical connection terminal assembly of claim 1, further comprising a splice point disposed in the input optical fiber configured to optically couple the input optical fiber to an optical fiber of a cable.

5. The multi-port optical connection terminal assembly of claim 1, wherein the plurality of connection nodes are comprised of a plurality of fiber optic connectors optically connecting each of the plurality of the output optical fibers.

6. The multi-port optical connection terminal assembly of claim 3, wherein the output end of the body of the optical splitter being disposed within the internal cavity of the enclosure.

7. The multi-port optical connection terminal assembly of claim 3, further comprising a protective jacket disposed around at least a portion of the input optical fiber of the optical splitter and abutting the input end of the body of the optical splitter.

8. The multi-port optical connection terminal assembly of claim 3, further comprising a protective jacket disposed around at least a portion of one of the output optical fibers of the optical splitter.

9. The multi-port optical connection terminal assembly of claim 3, wherein the output end of the body of the optical splitter is disposed opposite the input end of the body of the optical splitter.

10. The multi-port optical connection terminal assembly of claim 4, further comprising:
    a protective jacket disposed around at least a portion of the input optical fiber of the optical splitter;
    a protective jacket disposed around at least one of the output optical fibers of the optical splitter, and
    a splice protector disposed around the splice point, the protective jacket, and a cable jacket of the cable.

11. The multi-port optical connection terminal assembly of claim 7, wherein the protective jacket is formed as a member having a general oval cross-section and receiving the at least the portion of the input optical fiber.

12. The multi-port optical connection terminal assembly of claim 7, wherein the protective jacket is formed as a member having a general oval cross-section and receiving the at least the portion of at least one output optical fiber.

13. The multi-port optical connection terminal assembly of claim 7, further comprising a protective tube disposed around at least a portion of the protective jacket and the input end of the body of the optical splitter, the protective tube configured to attach the protective jacket to the input end of the body of the optical splitter.

14. The multi-port optical connection terminal assembly of claim 13, further comprising:
    a furcation tube disposed around the protective tube, the input end of the body of the optical splitter and the portion of the protective jacket disposed around the input optical fiber, and the protective jacket disposed around the at least a portion of one of the output optical fibers; and
    potting compound disposed inside the furcation tube,
    wherein the potting compound binds the protective jacket disposed around the input optical fiber to the input end of the body of the optical splitter.

15. The multi-port optical connection terminal assembly of claim 14, wherein the furcation tube is formed as a second cylinder member receiving at least a portion of the protective tube, the input and output ends of the body of the optical splitter, and the portion of the strain relief jacket.

16. The multi-port optical connection terminal assembly of claim 14, wherein the potting compound comprises epoxy.

17. The multi-port optical connection terminal assembly of claim 15, further comprising a second protective tube disposed around the furcation tube and a portion of the enclosure, the second protective tube configured to attach the furcation tube to the enclosure.

18. The multi-port optical connection terminal assembly of claim 17, further comprising a clamp to secure the furcation tube to the enclosure.

19. A multi-port optical connection terminal assembly, comprising:
   an enclosure including an internal cavity, an input orifice, and a plurality of optical connection nodes;
   an optical splitter comprising a body, an input optical fiber extending from the body, and plurality of output optical fibers extending from the body; and
   a splice point on the input optical fiber configured to contact an optical fiber of a cable,
   wherein a portion of the body of the optical splitter is disposed between the splice point and the enclosure, and the plurality of the output optical fibers are disposed inside the internal cavity, and the input optical fiber is outside the internal cavity.

20. A method of assembling a multi-port optical connection terminal assembly, comprising:
   providing an optical splitter comprising a body, an input optical fiber, and plurality of output optical fibers;
   providing an enclosure comprising an internal cavity, an input orifice, and a plurality of optical connection nodes,
   creating a furcation structure;
   attaching the furcation structure to the enclosure; and
   sealing the enclosure with a cover of the enclosure,
   wherein at least a portion of the body of the optical splitter is disposed outside the internal cavity of the enclosure, the input optical fiber is disposed outside the internal cavity of the enclosure, and the plurality of output optical fibers are disposed inside the internal cavity.

21. The method of assembling the multi-port optical connection terminal assembly of claim 20, wherein the creating the furcation structure comprises
   disposing a protective jacket around at least a portion of the input optical fiber; and abutting the protective jacket against an input end of the body of the optical splitter,
   wherein the input optical fiber extends outside the body of the optical splitter from the input end of the body of the optical splitter.

22. The method of assembling the multi-port optical connection terminal assembly of claim 20, wherein the creating the furcation structure comprises
   disposing a protective jacket around at least a portion of at least one of the output optical fibers,
   wherein the output optical fibers extend outside the body of the optical splitter from the output end of the body of the optical splitter.

23. The method of assembling the multi-port optical connection terminal assembly of claim 20, wherein the attaching the furcation structure to the enclosure further comprises disposing a second protective tube around at least a portion of the furcation structure and a portion of the enclosure.

24. The method of assembling the multi-port optical connection terminal assembly of claim 20, wherein the attaching the furcation structure to the enclosure further comprises securing a portion of the furcation structure to the enclosure with a clamp.

25. The method of assembling the multi-port optical connection terminal assembly of claim 21, wherein the creating the furcation structure further comprises disposing a protective tube around at least a portion of the protective jacket disposed around the input optical fiber and the input end of the body of the optical splitter, the protective tube configured to attach the protective jacket to the input end of the body of the optical splitter.

26. The method of assembling the multi-port optical connection terminal assembly of claim 22, wherein the creating the furcation structure further comprises disposing a protective tube around at least a portion of the protective jacket disposed around at least one of the output optical fibers and the output end of the body of the optical splitter.

27. The method of assembling the multi-port optical connection terminal assembly of claim 21, further comprising optically coupling the input optical fiber to an optical fiber of a cable at a splice point disposed in the input optical fiber.

28. The method of assembling the multi-port optical connection terminal assembly of claim 23, wherein the second protective tube is a heat shrink tube with a second adhesive lining.

29. The method of assembling the multi-port optical connection terminal assembly of claim 25, wherein the creating the furcation structure further comprises binding the protective jacket disposed around the input optical fiber to the input end of the body of the optical splitter by disposing a furcation tube around at least a portion of the protective tube, the input end of the body of the optical splitter, and the at least the portion of the strain relief jacket, and disposing potting compound inside the furcation tube.

30. The method of assembling the multi-port optical connection terminal assembly of claim 25, wherein the attaching the furcation structure to the enclosure further comprises
   disposing an output end of the body of the optical splitter within the internal cavity of the enclosure,
   wherein the plurality of output optical fibers extend outside the body of the optical splitter from the output end of the body of the optical splitter.

31. The method of assembling the multi-port optical connection terminal assembly of claim 27, wherein the optically coupling the input optical fiber to the optical fiber of the cable further comprises disposing a splice protector around the splice point, a portion of the protective jacket, and a cable jacket of the cable.

32. The method of assembling the multi-port optical connection terminal assembly of claim 25, wherein the potting compound comprises epoxy.

33. The method of assembling the multi-port optical connection terminal assembly of claim 25, wherein the protective tube is a heat shrink tube.

34. The method of assembling the multi-port optical connection terminal assembly of claim 26, wherein the attaching the furcation structure to the enclosure further comprises optically connecting the plurality of the optical connection nodes comprised of a plurality of fiber optic connectors to each of the plurality of output optical fibers.

* * * * *